United States Patent Office 3,397,966
Patented Aug. 20, 1968

3,397,966
OZONE DETERMINATION
Charles Arthur Plantz, Pittsburgh, Pa., assignor to Mine Safety Appliances Company, Pittsburgh, Pa., a corporation of Pennsylvania
No Drawing. Filed Nov. 17, 1964, Ser. No. 411,726
11 Claims. (Cl. 23—232)

ABSTRACT OF THE DISCLOSURE

Ozone in other gases is detected or quantitatively determined by passing it through an indicator of sulfonephthalein dye in its alkaline form on an inert carrier, which indicator changes color in response to contact with ozone. Highly sensitive indicators have glass beads coated with magnesium oxide, zirconium oxide, or titanium oxide and impregnated with the dye.

---

This invention relates to the colorimetric qualitative and quantitative determination of ozone in other gases.

Convenient, simple and rapid methods have been used to determine some gases other than ozone in which the gas is passed through a dry solid indicator consisting of a solid carrier impregnated with a color changing reagent. However, to the best of my knowledge, no dry solid indicator has been found satisfactory for the detection and quantitative determination of ozone.

It is an object of this invention to provide a simple, rapid and reliable method of detecting and quantitatively determining ozone in gases, particularly in air, that is satisfactory for field and plant use, and that may be practiced by unskilled persons.

Another object is to provide a solid indicator that changes color on contact with ozone suitable for use in the foregoing object.

Other objects will be apparent from the following description and claims.

This invention is predicated on my discovery that when air or other gas containing ozone is contacted with a bed of solid inert carrier impregnated with a sulfonephthalein dye in its alkaline form there is a distinct color change from the alkaline dye color to white or off-white. When air or other gas to be tested is passed through such a solid indicator disposed in a transparent tube of glass or other inert material, the presence of ozone causes the development of the white color along the length of the indicator bed in the direction in which the air is passed, thus affording indication of the presence of ozone. The length over which the coloration occurs is dependent, when tested under standard conditions, upon the concentration of ozone in the atmosphere tested.

The carrier, preferably an inorganic absorbent, does not enter into the color producing reaction but serves merely as a physical carrier for the reagent, except that, if desired, an alkaline carrier may be used to convert the reagent dye to its alkaline form. Granular absorbents, such as silica gel and activated alumina, are suitable carriers, but it is preferred to use a carrier of the type disclosed in McConnaughey et al., Ser. No. 292,461, and now Patent No. 3,350,175, issued Oct. 31, 1967, wherein glass beads or the like are coated with an adherent film of inorganic absorbent. Although any inert inorganic absorbent coating, such as clay or diatomaceous earth, is suitable, it is preferred to use magnesium hydroxide, zirconium oxide or titanium oxide which results in an indicator with superior sensitivity.

Any of the sulfonephthalein dyes may be used in this invention, such as, for example, 3′,3″dibromothymolsulfonephthalein
phenolsulfonephthalein
3′,3″,5′,5″-tetrabromophenolsulfonephthalein
dibromocresolsulfonephthalein
3′,3″,5′,5″-tetrabromo-m-cresolsulfonephthalein
o-cresolsulfonephthalein
3′,3″-dichlorophenolsulfonephthalein
m-cresolsulfonephthalein, and
thymolsulfonephthalein.

The indicator of this invention is simply prepared by mixing together a carrier with a solution of sulfonephthalein dye and sufficient base to convert the dye to its alkaline form, suitably a weight of sodium carbonate equal to that of the dye, preferably using an alcohol, water, or mixtures thereof as a solvent. The impregnated carrier is then dried, preferably under vacuum at room or moderately elevated temperature, to remove substantially all the solvent, or until the indicator is free-flowing.

Exemplifying a preferred embodiment of this invention, from about 0.05 to 1.5 grams, preferably 0.3 gram, of magnesium hydroxide is mixed with 100 cc. of 20–200 mesh glass beads, preferably 60–80 mesh. The magnesium hydroxide should be at least 100 mesh or finer, flocculent precipitated powder being very suitable. A solution of about 1 to 50 milligrams of 3′,3″-dibromothymolsulfonephthalein, preferably 5 milligrams, and an equal amount of sodium carbonate dissolved in any convenient amount of water, suitably 10 cc., are added, and the mixture is vacuum dried, with agitation. The resultant free-flowing indicator is blue. When other sulfonephthalein dyes are used in place of 3′,3″-dibromothymolsulfonephthalein, the indicator is the color of the alkaline form of the dye.

In the practice of the invention the gas to be tested is passed through a bed of the indicator. Although this may be done in many ways, it is preferred, especially for field use, to apply it in the general manner described in Patent No. 2,174,349, to John B. Littlefield, i.e., an elongate bed of the solid indicator is disposed in a small cross-sectional tube of glass or other inert transparent material, held in place by end plugs of, for example, glass wool, glass tape, or organdy, and the ends of the tube are sealed. When a determination is to be made the sealed ends are opened and the air or other gas to be tested is flowed through the tube by any suitable means, as by an aspirator bulb. The presence of ozone in the atmosphere converts the alkaline-dye-colored indicator to a white color promptly. To quantitatively determine ozone, a measured volume of gas, supplied in any way as by means of an aspirator bulb with known volumetric delivery, is passed through a tube as just described, and the length over which the white color is developed affords a measure of the concentration of ozone. By comparing the length of coloration with a scale calibrated by the use of the standard volume of different known concentrations of ozone in air there is thus a direct determination.

The indicator may tend to lose sensitivity on long storage if air entrapped within the tube is not removed. The filled tube may be evacuated to remove the air before sealing or, preferably, the free space in the tube may be filled with a non-oxidizing inert gas, such as, for example, nitrogen or argon.

As indicating the sensitivity of this reagent, it is possible using tubes prepared as described to detect quantitatively 0.025 p.p.m. of ozone in air using a 100 ml./minute sample for 10 minutes with a 2 mm. I.D. tube having a 2-inch length of indicator.

According to the patent statutes, I have explained the principle and mode of practicing my invention and have described what I now consider to be its best embodiment. However, I desire to have it understood that, within the scope of the appended claims, the invention may be practiced otherwise than as specifically described.

I claim:
1. A method of detecting ozone in a gas which comprises contacting the gas to be tested with a solid indicator consisting essentially of an inert solid carrier impregnated with a sulfonephthalein dye in its alkaline form, said indicator being changed to a white color in response to contact with ozone.

2. A method according to claim 1 comprising passing a predetermined volume of ozone containing gas to be tested through an elongate body of said solid indicator confined within a transparent container, the change of color occurring over a length that is dependent on the concentration of ozone in the gas being tested, and measuring the length over which the color change occurs.

3. A method according to claim 2 in which the solid carrier is glass beads coated with an absorbent selected from the group consisting of magnesium hydroxide, zirconium oxide and titanium oxide.

4. A solid colorimetric indicator for determining ozone consisting essentially of glass beads coated with an absorbent selected from the group consisting of magnesium hydroxide, zirconium oxide and titanium oxide and impregnated with a sulfonephthalein dye in its alkaline form.

5. An indicator according to claim 4 in which the absorbent is magnesium hydroxide.

6. An indicator according to claim 5 in which the sulfonephthalein dye is 3',3''-dibromothymolsulfonephthalein.

7. An indicator according to claim 4 in which the glass beads are between about 20 and 200 mesh and having between about 0.05 to 1.5 grams of absorbent and between about 1 and 50 milligrams of sulfonephthalein dye for each 100 cc. of glass beads.

8. An indicator according to claim 7 in which the absorbent is magnesium hydroxide and the dye is 3',3''-dibromothymolsulfonephthalein.

9. Means for determining ozone in a gas comprising a sealed transparent tube free of air and having disposed therein an elongate body of a solid colorimetric indicator consisting essentially of glass beads coated with an absorbent selected from the group consisting of magnesium hydroxide, titanium oxide and zirconium oxide and impregnated with a sulfonephthalein dye in its alkaline form.

10. Means according to claim 9 in which the glass beads are between about 20 and 200 mesh and having between about 0.05 to 1.5 grams of absorbent and between about 1 and 50 milligrams of sulfonephthalein dye for each 100 cc. of glass beads.

11. Means according to claim 10 in which the absorbent is magnesium hydroxide and the dye is 3',3''-dibromothymolsulfonephthalein.

References Cited
UNITED STATES PATENTS

| | | | |
|---|---|---|---|
| 2,103,187 | 12/1937 | Schröter | 23—232 |
| 2,487,077 | 11/1949 | Shepherd | 23—232 |
| 2,643,230 | 6/1953 | Mooradian et al. | 23—253 XR |
| 2,963,351 | 12/1960 | Stanford et al. | 23—232 |

MORRIS O. WOLK, *Primary Examiner.*

R. M. REESE, *Assistant Examiner.*